July 14, 1970     R. WILDER     3,520,582

PROJECTOR STAND AND STORAGE UNIT

Filed Aug. 26, 1968     2 Sheets-Sheet 1

INVENTOR
RICHARD WILDER

BY

ATTORNEY

United States Patent Office 3,520,582
Patented July 14, 1970

3,520,582
PROJECTOR STAND AND STORAGE UNIT
Richard Wilder, 21 French Road,
Rochester, N.Y. 14618
Filed Aug. 26, 1968, Ser. No. 755,029
Int. Cl. A47b 83/00
U.S. Cl. 312—237            15 Claims

ABSTRACT OF THE DISCLOSURE

The unit provides a storage cabinet in which a slide or movie projector is concealed and mounted and which cabinet can be simply and quickly converted into a stand for the projector during use thereof. In its normal storage orientatiton, the unit doubles as an attractive and useful piece of furniture.

FIELD OF THE INVENTION

This inventiton relates to a combination projector stand and storage cabinet therefor which doubles as a useful and attractive piece of furniture in which the projector is concealed during storage thereof.

DESCRIPTION OF THE PRIOR ART

The present invention solves the related problems of storing a movie and/or slide projector, storing the rolls of movie film and/or the slide containers, storing various other paraphernalia associated with such projectors, finding all of the equipment when it is desired to show pictures, moving such equipment to the room where the pictures are to be projected, preparing a stand for the projector, after projection of the pictures returning all of the equipment to its storage location, and removing the make-shift projector stand. These related problems are solved by the present invention as will be discussed in detail hereinafter while at the same time providing an attractive and useful piece of furniture.

SUMMARY OF THE INVENTION

The present invention comprises a combination projection stand and storage unit which doubles as a piece of furniture. The unit includes a pair of sections positioned side-by-side which are hinged together at the top such that one section can be swung or folded upside-down onto the top of the other section. A projector is mounted upside-down in the bottom of the section to be folded-up, such that when the section is folded-up the projector is right-side up and ready to operate. Said section can contain drawers which are also mounted upside-down for holding materials such as slides to be used with the projector. The two sections can be identical with a projector on the bottom of each or one section can be stationary and can be a table, stand, chest of drawers or the like, and can be larger or smaller than the other movable section.

BRIEF DESCRIPTION OF THE DRAWINGS

The above objects and advantages of the present invention will be more fully understood by reference to the following detailed description when read in conjunction with the attached drawing, wherein like reference numerals refer to like elements and in which.

DETAILED DESCRIPTION OF THE PREFERRED EMBODIMENT

Figure 1:
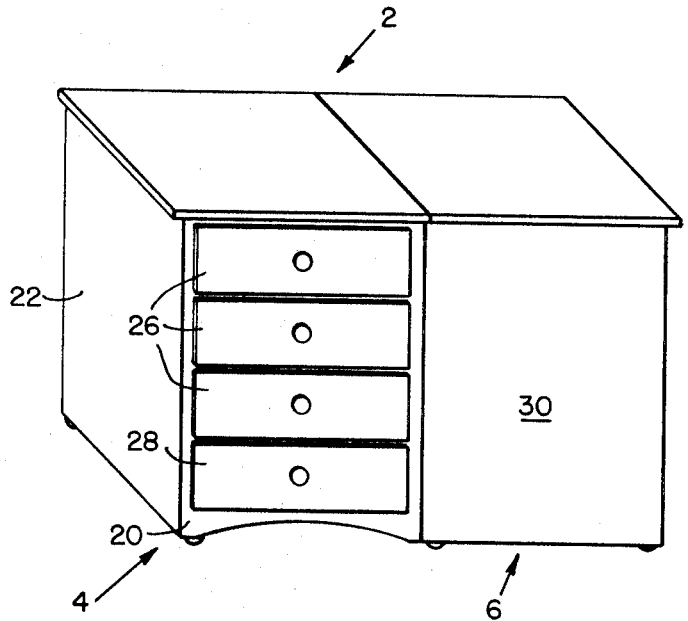
FIG. 1 is a front perspective view of the preferred embodiment of the stand and storage unit of the present invention showing the unit in its normal, unfolded position.

Referring now in detail to the drawing which illustrates a preferred embodiment of the present invention, the combination projector stand and storage unit 2 includes a pair of sections 4 and 6 which are hingedly connected together at the top thereof by means, for example of a pair of hinges 8. The bottom of section 4 is provided with a compartment 10 of a size sufficient to receive and permanently store therein a projector 12. The projector 12 is mounted within the compartment 10 by means of screws, bolts, straps or the like (not shown) in such manner that the elevator foot is operable and the various controls are accessible. A portion of a sidewall 14 of section 4 is cut away to provide an opening 16 in front of the lens 18 of the projector. It is preferred though not essential that the opening 16 be provided in that sidewall of secion 4 which is adjacent section 6 so that it will be concealed in the unfolded position of the unit. It is to be understood that a hole or window can be used in place of opening 16, it only being essential that the light coming through the lens not be blocked.

Figure 2:
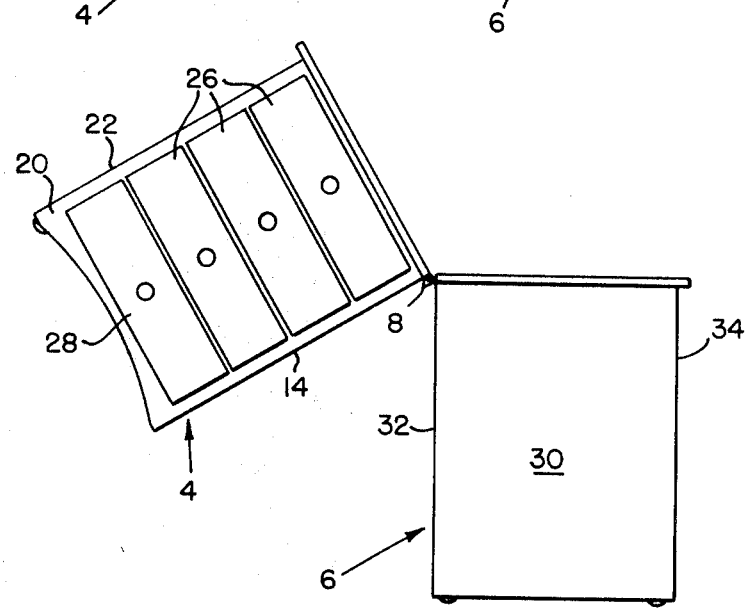
FIG. 2 is a front view of the unit of FIG. 1 with one section swung part way up.
Figure 3:
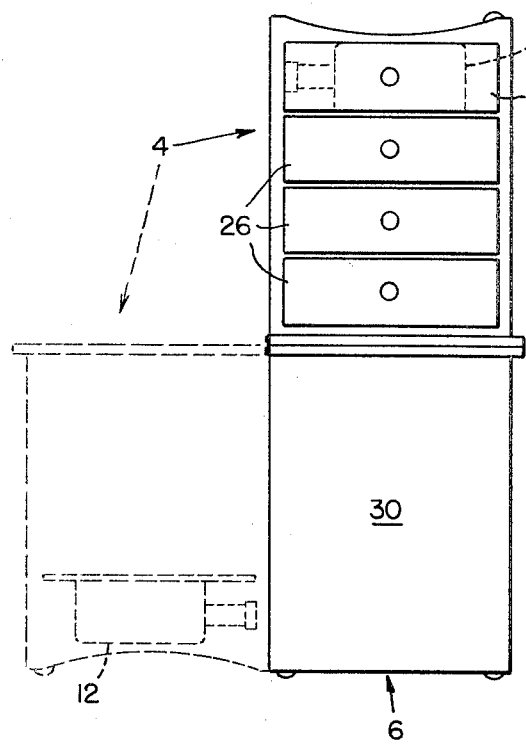
FIG. 3 is a front view showing one section completely folded up into the operation for the projector (with the unfolded position shown in dotted lines)
Figure 4:
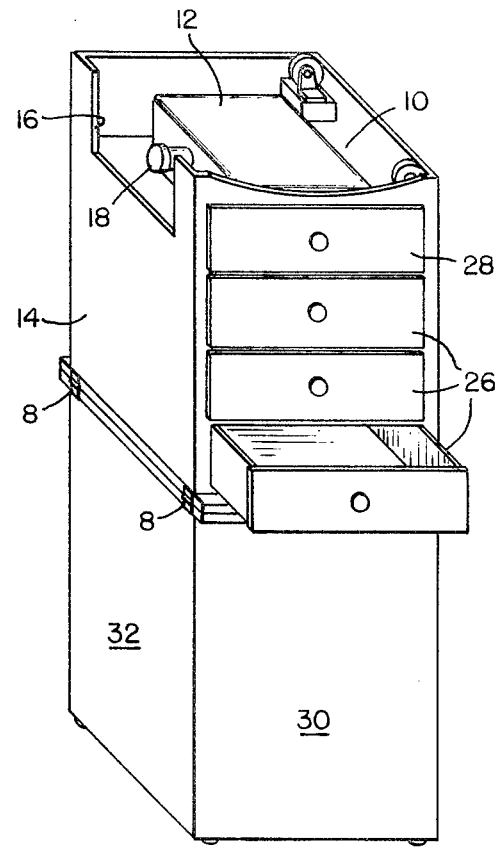
FIG. 4 is a perspective view of the unit with one section completely folded up on top of the other section showing the projector in its operative position.
Figure 5:
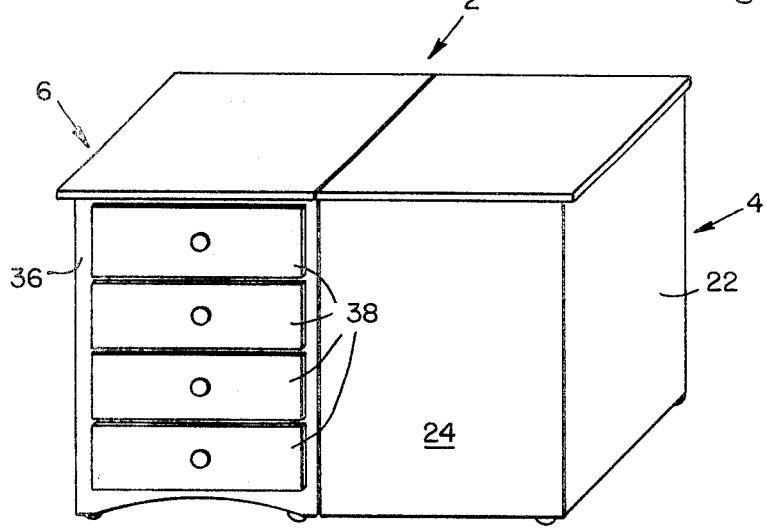
FIG. 5 is a rear perspective view of the unit of FIG. 1.

The unit 2 is shown in its normal, unfolded, or storage position or orientation in FIG. 1. FIG. 2 shows section 4 containing the projector in the bottom thereof partially lifted or rotated about section 6 to its folded-up or projectiton position or orientation and FIGS. 3 and 4 show the unit 2 completely folded up.

Section 4 preferably comprises a front wall 20, sidewalls 22 and 14 and rear wall 24. Section 4 has the appearance of being a normal chest of drawers in that drawers 26 are mounted to pull out from front wall 20. However, drawers 26 are preferably mounted upside-down so as to be used with the projector when section 4 is folded up. What appears to be a bottom drawer is a fake front 28 behind which is located compartment 10 housing the projector. It is to be noted that it is not essential that the drawers 26 pull out from the front wall 20; they can be mounted to pull out from any of the other walls of section 4. It is further not essential that section 4 contain drawers 26; any desired use can be made of this space such as to use it as one large compartment to which access can be had through a door or this space can simply be left open as in a table. The lower portion of section 4 which conceals the projector can employ a fake drawer 28 as shown or can have a plain front or the like. In the preferred embodiment section 4 is provided with casters at the front and rear of wall 22 only while section 6 includes castors under all four corners thereof because section 6 is to be used as the support or base for section 4 when the projector is being used.

Section 6 includes a front wall 30, sidewalls 32 and 34 and a rear wall 36. In the preferred embodiment shown, section 6 is a chest of drawers which includes a plurality of drawers 38 which pull out from the rear wall 36. It is to be noted that the drawers 38 in section 6 need not open from wall 36 but can open from any wall as desired. In fact section 6 need not be a chest of drawers but can simply be made in the form of a table or in any other form as desired. Although section 6 is preferably of a size substantially identical to that of section 4, it can be longer and/or wider as desired and can be higher or lower as long as it includes an area adjacent section 4 which will support section 4 and the projector when section 4 is folded-up into position for use of the projector.

In another embodiment of the present invention each one of the sections 4 and 6 is provided with a compartment adjacent the bottom thereof wherein a projector is mounted upside down. One of the projectors can be a slide projector and the other projector can be a movie projector. In this embodiment it is preferred that each section be provided with four castors, legs or supports, one below each of the four corners thereof. In this embodiment sections 4 and 6 can be identical to each other or the drawers in one section can open from the front and the drawers in the other section can open from the back. FIG. 4 can be considered as illustrating section 6 folded-up on top of section 4 in this embodiment in which each section stores a projector upside-down in the bottom thereof. Further, two sections can be used without the hinges whereby they can be used as tables in different locations, and also one table can be used independently of the other and placed upside-down on the floor or on a piece of furniture. The mounting for the projector can be a support plate which is rotatably mounted in the cabinet or section such that the projector will be right-side up when in the bottom and when the cabinet is swung up, the mounting will rotate with respect to the cabinet such that the projector will be right-side up at all times. Such a mounting can be made stable simply by positioning the projector somewhat lower than the axis of the rotatable mounting.

The invention has been described in detail with particular reference to preferred embodiments thereof, but it will be understood that variations and modifications can be effected within the spirit and scope of the invention as described hereinabove and as defined in the appended claims.

I claim:
1. A combination stand and storage unit for a projector comprising:
 a pair of sections hinged together adjacent their tops such that one section can be folded up and positioned upside-down on top of the other section, and
 a storage compartment adjacent the bottom of said one section adapted to store a projector therein.

2. The apparatus according to claim 1 including a projector mounted upside-down in said compartment.

3. The apparatus according to claim 2 in which said projector is concealed in said compartment.

4. The apparatus according to claim 1 wherein said compartment has a light passageway therein located so as to be positioned in front of the lens of a projector to be stored therein.

5. The apparatus according to claim 1 in which said one section includes a plurality of drawers therein which are mounted upside-down whereby they will be right-side up when said one section is upside-down.

6. The apparatus according to claim 1 in which said other section includes a plurality of drawers which are mounted right-side up.

7. The apparatus according to claim 1 in which said sections are of substantially identical height, width and depth.

8. The apparatus according to claim 1 in which said sections are hingedly connected such that either section can be folded up on top of the other section and including a storage compartment adjacent the bottom of each of said sections adapted to store a projector therein.

9. The apparatus according to claim 8 including a projector mounted upside-down in each of said sections.

10. A combination stand and storage unit for a projector comprising:
 a first section,
 a second section,
 means hingedly connecting said sections together adjacent the tops thereof such that at least one of said sections can be folded up and positioned upside-down on top of the other of said sections, and
 a compartment adjacent the bottom of said at least one section adapted to store a projector therein.

11. The apparatus according to claim 10 including a projector mounted upside-down in said compartment.

12. The apparatus according to claim 11 in which said at least one section includes a plurality of drawers mounted upside-down therein.

13. The apparatus according to claim 12 in which said other section includes a plurality of drawers mounted right-side up therein.

14. A cabinet having a top and a bottom, a compartment adjacent the bottom of said cabinet, and a projector mounted in said compartment such that when said cabinet is turned upside down said projector will be right-side up.

15. The apparatus according to claim 14 wherein said projector is mounted upside down in said compartment.

References Cited

UNITED STATES PATENTS

| 515,955 | 3/1894 | Ettinger | 312—240 |
| 2,481,106 | 9/1949 | Gold | 312—20 X |
| 2,607,649 | 8/1952 | Johnson | 312—20 |
| 3,066,993 | 12/1962 | Mark | 312—20 |
| 3,220,790 | 11/1965 | White | 312—240 |
| 1,172,945 | 2/1916 | Cook | 312—20 |
| 2,543,029 | 2/1951 | Kasler | 312—20 |
| 2,679,891 | 6/1954 | Rubin | 297—129 |
| 3,137,532 | 6/1964 | Tyll | 312—29 |

NILE C. BYERS, JR., Primary Examiner